United States Patent
Wang et al.

(10) Patent No.: US 9,697,103 B2
(45) Date of Patent: Jul. 4, 2017

(54) AUTOMATIC KNOWLEDGE BASE GENERATION FOR ROOT CAUSE IN APPLICATION PERFORMANCE MANAGEMENT

(71) Applicant: International Business Machines Corporation, Armonk, NY (US)

(72) Inventors: Chen Wang, Beijing (CN); Lanjun Wang, Beijing (CN); Hai Shan Wu, Beijing (CN); Yi Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 26 days.

(21) Appl. No.: 14/813,126

(22) Filed: Jul. 30, 2015

(65) Prior Publication Data

US 2017/0031803 A1 Feb. 2, 2017

(51) Int. Cl.
*G06F 9/44* (2006.01)
*G06F 11/36* (2006.01)
*G06F 11/32* (2006.01)
*G06F 11/34* (2006.01)

(52) U.S. Cl.
CPC ........ *G06F 11/3636* (2013.01); *G06F 11/323* (2013.01); *G06F 11/3466* (2013.01)

(58) Field of Classification Search
CPC .............................. G06F 11/3636; G06F 8/24
USPC ......................................................... 717/127
See application file for complete search history.

(56) References Cited

U.S. PATENT DOCUMENTS

| | | | | |
|---|---|---|---|---|
| 7,096,459 B2 * | 8/2006 | Keller | ................... | G06F 11/079 714/E11.027 |
| 7,269,824 B2 * | 9/2007 | Noy | ..................... | G06F 11/3409 714/E11.192 |
| 7,363,583 B1 * | 4/2008 | Costa | ..................... | G06Q 10/10 715/734 |
| 7,568,192 B2 * | 7/2009 | Mitchell | ............... | G06F 11/366 717/127 |
| 7,818,722 B2 * | 10/2010 | Cain, III | ............. | G06F 11/3466 717/127 |
| 7,954,090 B1 * | 5/2011 | Qureshi | ................. | G06N 5/048 714/25 |
| 8,225,291 B2 * | 7/2012 | Chung | ................ | G06F 11/3419 714/38.1 |
| 8,577,911 B1 * | 11/2013 | Stepinski | ................ | G06F 17/30 707/765 |
| 8,689,108 B1 * | 4/2014 | Duffield | ................. | G06Q 30/02 709/220 |

(Continued)

*Primary Examiner* — Lewis A Bullock, Jr
*Assistant Examiner* — Theodore Hebert
(74) *Attorney, Agent, or Firm* — Ido Tuchman; Kevin Jordan (57) ABSTRACT

A system for determining a root cause of a performance issue of a software application executing in a distributed computer system. The system includes constructing a hierarchical graph of metrics of a component of the distributed computer system based on search traces of the metrics of different users. A parent-child edge between a first metric and a second metric in the hierarchical graph is constructed when there is a sequential association between the search traces. A sibling edge between the first metric and the second metric in the hierarchical graph is constructed when there is no sequential association between the search traces. A metric investigation recommendation is provided to address the performance issue based on traversal of the hierarchical graph of the metrics.

9 Claims, 7 Drawing Sheets

(56) References Cited

U.S. PATENT DOCUMENTS

| | | | | |
|---|---|---|---|---|
| 8,762,951 B1* | 6/2014 | Kosche | ............... | G06F 11/3476 |
| | | | | 717/127 |
| 9,043,894 B1* | 5/2015 | Dennison | ............ | H04L 63/1408 |
| | | | | 726/11 |
| 9,335,911 B1* | 5/2016 | Elliot | ................ | G06F 17/30572 |
| 2003/0041047 A1* | 2/2003 | Chang | ............... | G06F 17/30017 |
| 2003/0135507 A1* | 7/2003 | Hind | ................ | G06F 17/30592 |
| 2004/0083206 A1* | 4/2004 | Wu | ................... | G06F 17/30643 |
| 2009/0177642 A1* | 7/2009 | Chung | ................ | G06F 11/3419 |
| 2010/0057677 A1* | 3/2010 | Rapp | .................... | G06F 9/4446 |
| | | | | 707/E17.014 |
| 2010/0576771 | 3/2010 | Rapp et al. | ............. | G06F 17/30 |
| 2011/0099205 A1* | 4/2011 | Shmueli | ............ | G06F 17/30911 |
| | | | | 707/797 |
| 2012/0030657 A1* | 2/2012 | Gao | ........................ | G06F 9/524 |
| | | | | 717/128 |
| 2012/0221555 A1* | 8/2012 | Byrne | ............... | G06F 17/30979 |
| | | | | 707/723 |
| 2012/0221556 A1* | 8/2012 | Byrne | ............... | G06F 17/30734 |
| | | | | 707/723 |
| 2012/0226492 A1* | 9/2012 | Tsuboi | ............. | G06F 17/30684 |
| | | | | 704/9 |
| 2012/0323899 A1* | 12/2012 | Ilyas | ................ | G06F 17/30867 |
| | | | | 707/723 |
| 2013/0091387 A1* | 4/2013 | Bohnet | ............... | G06F 11/3612 |
| | | | | 714/38.1 |
| 2013/0198116 A1* | 8/2013 | Bhamidipaty | ...... | H04L 41/5074 |
| | | | | 706/12 |

* cited by examiner

1. CPU->Disk I/O->JDBC Excp->JDBC Pool->Network I/O
2. CPU->Disk I/O->JDBC Excp->Network I/O
3. JDBC Excp -> Network I/O -> JDBC Pool
4. Disk I/O -> JDBC Excp ->CPU -> Inst Req ->GC -> Mem.
5. JDBC Excp -> Disk I/O
6. JDBC Excp -> CPU -> GC -> Inst. Req.
7. CPU -> JDBC Pool -> Disk I/O -> GC -> Mem
8. CPU -> Instr. Req.
9. CPU -> Inst. Req -> GC
10. JDBC Excp. -> CPU -> Instr. Req. -> GC -> Mem

AUTOMATIC KNOWLEDGE BASE GENERATION FOR ROOT CAUSE IN APPLICATION PERFORMANCE MANAGEMENT

BACKGROUND

The present invention relates generally to application performance management, and more particularly to automatic knowledge base generation for root cause in application performance management.

Application performance management and monitoring is a discipline that focused on monitoring and managing the performance and availability of software applications. An important goal of application performance management and monitoring is to translate information technology metrics (machine generated data) into business value.

Cloud applications health monitoring and business level agreement insurance is important to make cloud services widely accepted and utilized. Finding the root cause of application problem is critical part to application business level agreement insurance. Furthermore, accurately identifying the root cause is challenging, especially in large-scale distributed dynamic environment, such as cloud service environments. However, for an inexperienced system administrator, all system metrics may be treated with equivalent importance. Thus, for an inexperienced system administrator, the cause detection may be time consuming and inefficient.

BRIEF SUMMARY

Accordingly, an example aspect of the present invention is a method for determining a root cause of a performance issue of a software application executing in a distributed computer system having multiple components. The method includes constructing a hierarchical graph of metrics of a component of the distributed computer system based on search traces of the metrics of different users. A parent-child edge between a first metric and a second metric in the hierarchical graph is constructed when there is a sequential association between the search traces of the first metric and the second metric for the different users. A sibling edge between the first metric and the second metric in the hierarchical graph is constructed when there is no sequential association between the search traces of the first metric and the second metric for the different users. The method includes providing a metric investigation recommendation to address the performance issue based on traversal of the hierarchical graph of the metrics.

Another example aspect of the present invention is an application management system for determining a root cause of a performance issue of a software application executing in a distributed computer system having multiple components. The system includes computer memory to store a hierarchical graph of metrics of a component of the distributed computer system. A computer processor is configured to construct the hierarchical graph of metrics of the component of the distributed computer system based on search traces of the metrics of different users. A parent-child edge between a first metric and a second metric in the hierarchical graph is constructed when there is a sequential association between the search traces of the first metric and the second metric for the different users. A sibling edge between the first metric and the second metric in the hierarchical graph is constructed when there is no sequential association between the search traces of the first metric and the second metric for the different users. The computer processor also provides a metric investigation recommendation to address the performance issue based on traversal of the hierarchical graph of the metrics.

Yet another example aspect of the present invention is a computer program product for determining a root cause of a performance issue of a software application executing in a distributed computer system having multiple components. The computer program product includes computer readable program code configured to: construct a hierarchical graph of metrics of a component of the distributed computer system based on search traces of the metrics of different users, where a parent-child edge between a first metric and a second metric in the hierarchical graph is constructed when there is a sequential association between the search traces of the first metric and the second metric for the different users, and where a sibling edge between the first metric and the second metric in the hierarchical graph is constructed when there is no sequential association between the search traces of the first metric and the second metric for the different users; and provide a metric investigation recommendation to address the performance issue based on traversal of the hierarchical graph of the metrics.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

The present invention is described with reference to embodiments of the invention. Throughout the description of the invention reference is made to FIGS. 1-7. When referring to the figures, like structures and elements shown throughout are indicated with like reference numerals.

Figure 1:
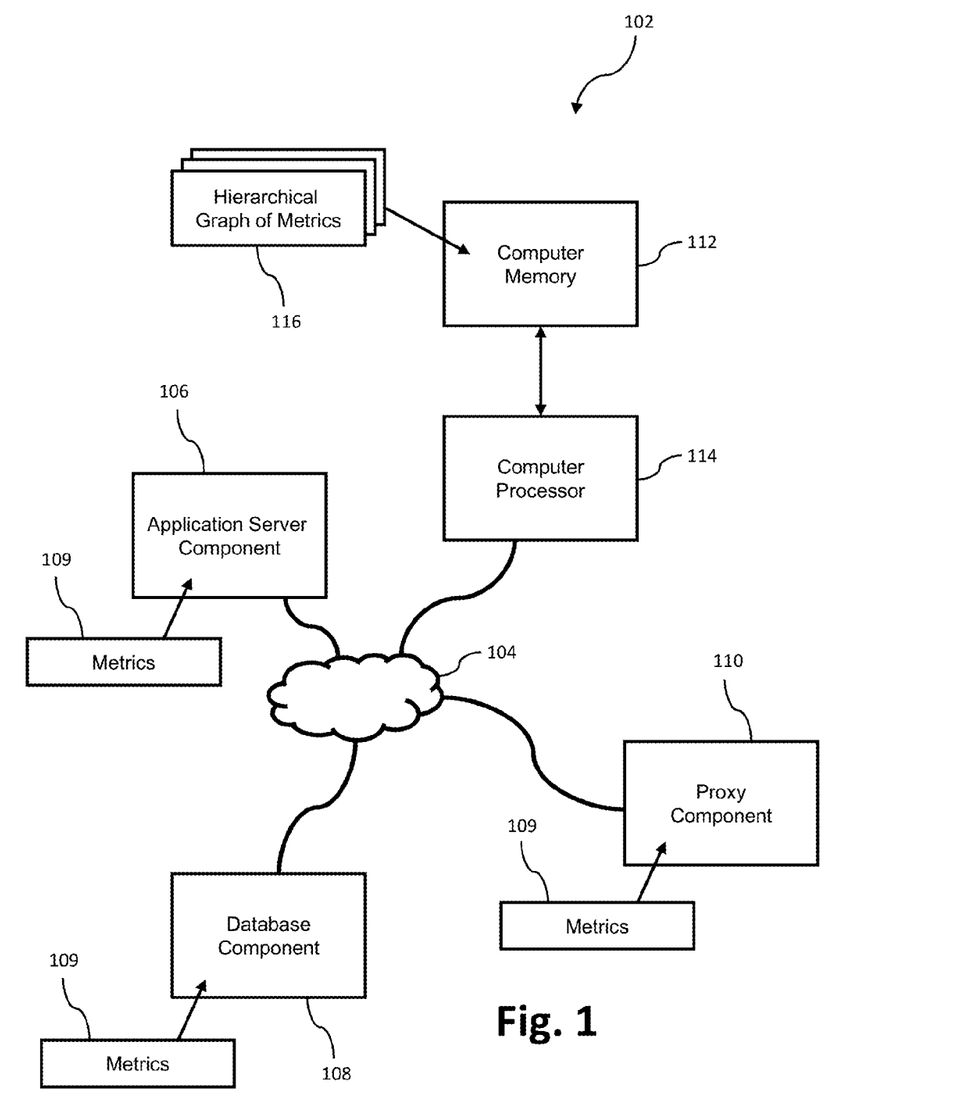
FIG. 1 shows an example application management system for determining a root cause of a performance issue of a software application executing in a distributed computer system contemplated by the present invention functions.

FIG. 1 shows an example application management system 102 for determining a root cause of a performance issue of a software application executing in a distributed computer system contemplated by the present invention. The system 102 includes a distributed computing environment with a number of components communicating through a network 104. The components may include, for example, an application server component 106, a database component 108 and a proxy component 110. As used herein, system components are long running processes that can be separately scaled according to system demands. Each component includes a set of metrics 109 for measuring the component's performance. For example, the application server component 106 may include metrics to measure performance of the CPU, Disk I/O, memory, garbage collection, network I/O, and java database connectivity. The network 104 may be a local area network (LAN), a wide area network (WAN) or a combination of the two.

The system 102 includes computer memory 112 and a computer processor 114. In one embodiment, the computer memory 112 and computer processor 114 are incorporated into a system component, such as the application server component 106. The computer memory 112 stores at least one hierarchical graph of metrics 116 of components of the distributed computer system. As discussed in detail below, the computer processor 114 constructs the hierarchical graph of metrics 116 based on different users' search traces of the metrics. A parent-child edge between a first metric and a second metric in the hierarchical graph 116 is constructed when there is a sequential association between the search traces of the first metric and the second metric for different users. A sibling edge between the first metric and the second metric in the hierarchical graph 116 is constructed when there is no sequential association between the search traces of the first metric and the second metric for the different users. The computer processor 114 further provides a metric investigation recommendation to address the performance issue based on traversal of the hierarchical graph of the metrics 116.

Figure 2:
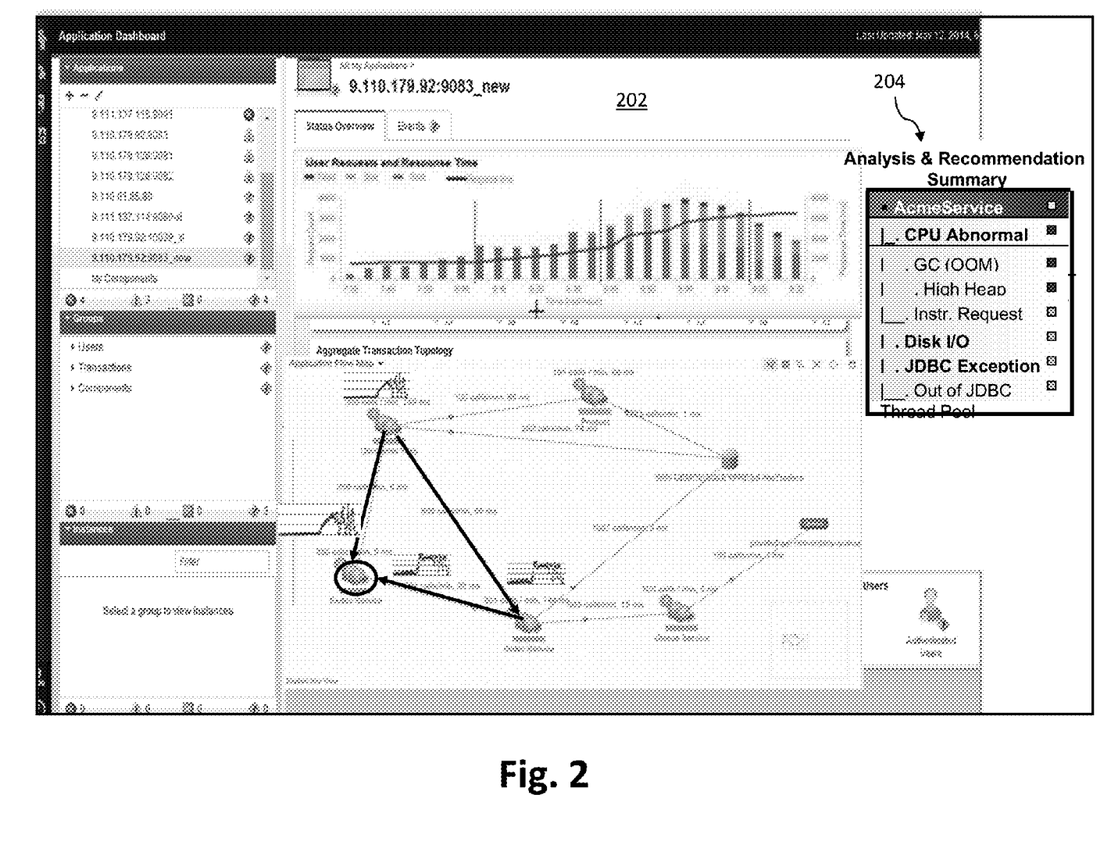
FIG. 2 shows a system administrator dashboard for monitoring the distributed computer system according to one embodiment of the present invention.

As shown in FIG. 2, the computer processor may present a dashboard 202 to different users or system administrators for monitoring the distributed computer system. The metric investigation recommendation 204 provided by the computer processor may be displayed at the dashboard 202. Additionally, the computer processor may parse uniform resource identifiers (URIs) from the dashboard 202 to identify a specific user of the distributed computer system, the component of the distributed computer system under investigation, and the metric of the component under investigation.

In a first example, a URI from the dashboard may be:
https://amp.mybluemix.net/acmir/node.js/
metrics?tenant=01&metric_param=CPU In this instance, the computer processor parses the host name as amp.mybluemix.net, the application as acmir, the component as node.js, the user identifier as 01, and the component metric as CPU.

In a second example, a URI from the dashboard may be:
https://01@amp.mybluemix.net/acmir/
metrics?comp=node.js&param=CPU In this instance, the computer processor again parses the host name as amp.mybluemix.net, the application as acmir, the component as node.js, the user identifier as 01, and the component metric as CPU. Thus, as a system administrator uses the dashboard 202 to investigate metrics of a component of the distributed computer system, the computer processor can record the user's identification (e.g., user 01), the component being investigated (e.g., node.js), and the metric being investigated (e.g., CPU).

As mentioned above, the computer processor constructs a hierarchical graph of metrics of the component of the distributed computer system based on search traces of the metrics of different users. More specifically, the search traces of the metrics of the different users include a temporal order of the different users' investigation of the metrics of the component of the distributed computer system.

Figure 3:
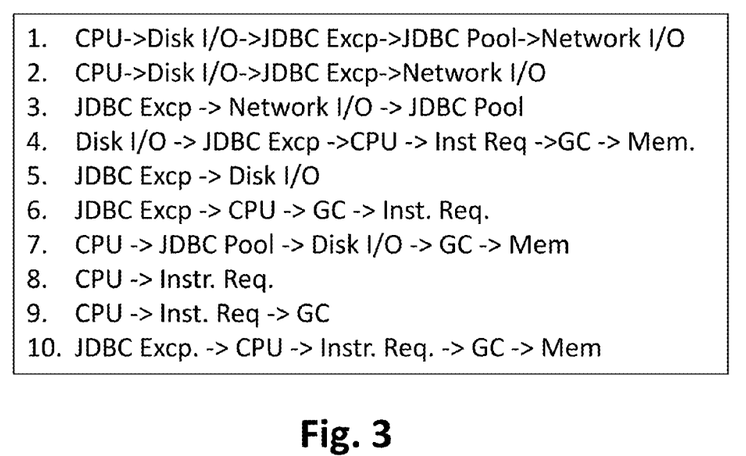
FIG. 3 shows example search traces contemplated by the present invention.

FIG. 3 shows example search traces contemplated by the present invention. Line 1 of the search trace shows that a user investigated component parameters in the following temporal order: CPU, Disk I/O, JDBC Excp, JDBC Pool, and Network I/O.

Figure 4:
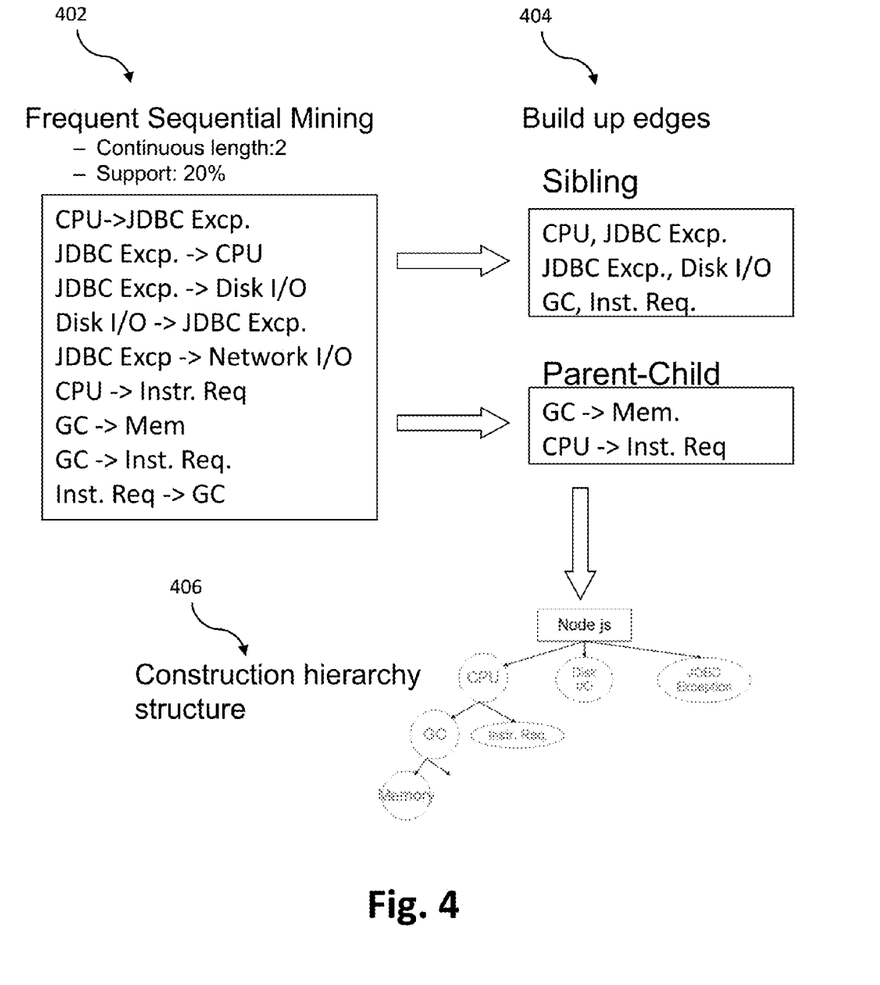
FIG. 4 shows a process for constructing the hierarchical graph of metrics of a component in accordance with one embodiment the invention.

FIG. 4 illustrates the process for constructing the hierarchical graph of metrics of a component in accordance with one embodiment the invention. As user search traces are recorded, the computer processor uses frequent sequential mining 402 to build up edges 404 of the hierarchical graph and construct the hierarchical graph 406. Specifically, a parent-child edge between a first metric and a second metric in the hierarchical graph is constructed when there is a sequential association between the search traces of the first metric and the second metric for different users. A sibling edge between the first metric and the second metric in the hierarchical graph is constructed when there is no sequential association between the search traces of the first metric and the second metric for the different users.

The application management system leverages the recorded searching trace of all users for automotive generation knowledge base. For root cause investigation, the corresponding searching pattern may originate from one of following sources: experts, general users with little knowledge, and general users with some knowledge. In one embodiment of the invention, the computer processor categorizes the different users of the distributed computer system based on the different users' effectiveness in addressing past performance issues in the distributed computer system. The computer processor constructs the hierarchical graph of metrics of the component of the distributed computer system based on search traces of the metrics of only the users whose effectiveness in addressing the past performance issues is above a threshold value.

In a particular embodiment, the effectiveness in addressing past performance issues in the distributed computer system is proportional an amount of gain in performance by the distributed computer system divided by an associated cost of solving an associated past performance issue. For example, the gain in performance may be a percentage of end user experience (EUE) improvement. The cost of the solution may be based on, for example, labor cost, infrastructure cost and time cost.

Figure 5:
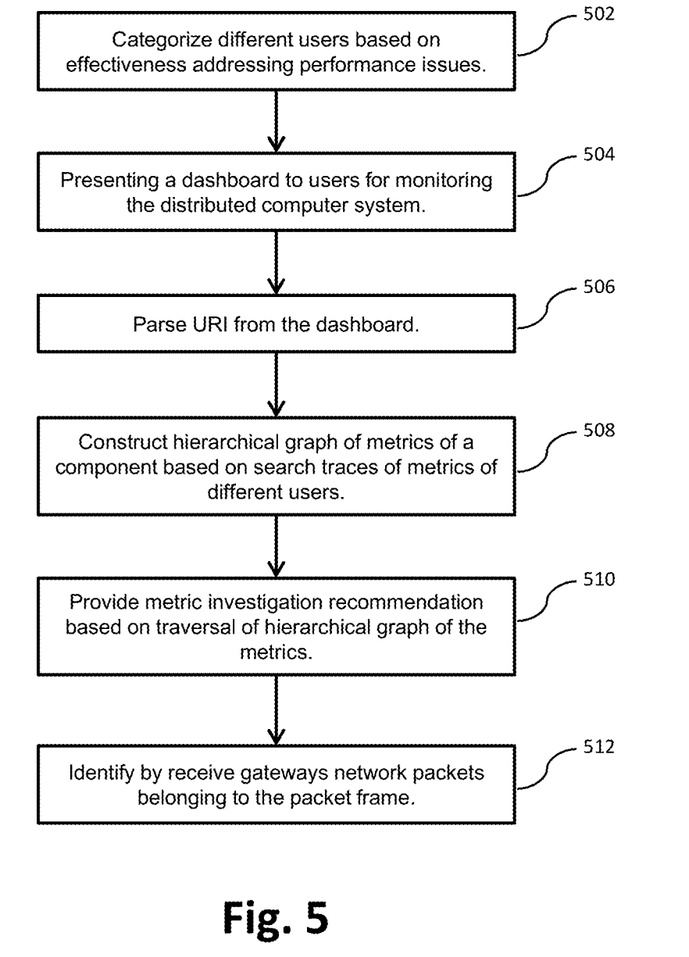
FIG. 5 shows an example method for determining a root cause of a performance issue of a software application executing in a distributed computer system, as contemplated by the present invention.

FIG. 5 shows an example method for determining a root cause of a performance issue of a software application executing in a distributed computer system, as contemplated by the present invention.

Operational flow begins at categorizing step 502. During this step, different users of the distributed computer system are categorized based on the different users' effectiveness in addressing past performance issues in the distributed computer system. As discussed above, the effectiveness in addressing past performance issues in the distributed computer system may be calculated as proportional to an amount of gain in performance by the distributed computer system divided by an associated cost of solving an associated past performance issue. In this manner, the system may identify effective search traces by the performance of past solutions.

For example, the system may record a user profile identification, the status of the distributed system before the user's action, the user's search trace, the action taken by the user, and the result of the user's action. As discussed above, the search traces of the metrics of the different users include a temporal order of the different users' investigation of the metrics of the component of the distributed computer system.

In recording the user profile identification, the system may access the login system from the administration dashboard, or an on duty list. In recording the status of the distributed system before the user's action, a component's throughput/response time and an associated time stamp may be recorded. Recording the action taken by the user may include infrastructure updates (such as adding 50 Gb of memory) and reports to administrators and/or development teams. In recording the result of the user's action, the component's throughput/response time and an associated time stamp may again be recorded after action is taken.

The method further includes presenting step 502. During presenting step 502, an administrator dashboard is displayed to different users (i.e., system administrators) for monitoring the distributed computer system. The dashboard displays various metrics of system components. The administrator dashboard includes uniform resource identifiers (URIs) for the user to activate (e.g., click or select) in order to investigate performance issues of the distributed computer system.

At parsing step 506, a uniform resource identifier (URI) is parsed from the administrator dashboard to identify a specific user of the distributed computer system, the component of the distributed computer system under investigation, and the metric of the component under investigation. The parsing step 506 can be used to both create a user's search trace and evaluate the user's effectiveness in addressing performance issues. Parsing step 506 may be implemented by a keyword parser builder. For example, the keyword parser builder may include domain specified rules related to a request URL from design documents. Benchmark operations may be used to obtain sample requests and recognize keywords by learning from rules set up by the benchmark. The request URL may be filtered based on, for example, the URL's length, the number of backslashes in the URL, and keywords in the URL, to obtain elements from the request URL. After parsing step 506, control passes to constructing operation 508.

At constructing operation 508, a hierarchical graph of metrics of a component of the distributed computer system is constructed based on search traces of the metrics of different users. A parent-child edge between a first metric and a second metric in the hierarchical graph is constructed when there is a sequential association between the search traces of the first metric and the second metric for the different users. A sibling edge between the first metric and the second metric in the hierarchical graph is constructed when there is no sequential association between the search traces of the first metric and the second metric for the different users. In one embodiment, the constructed hierarchical graph of metrics is based on search traces of the metrics of only the users whose effectiveness in addressing the past performance issues is above a threshold value. After constructing operation 508 is completed, control passes to providing operation 510.

At providing operation 510, a metric investigation recommendation is provided to the user to address the performance issue based on traversal of the hierarchical graph of the metrics. In one embodiment, the metric investigation recommendation is displayed at the dashboard.

Figure 6:
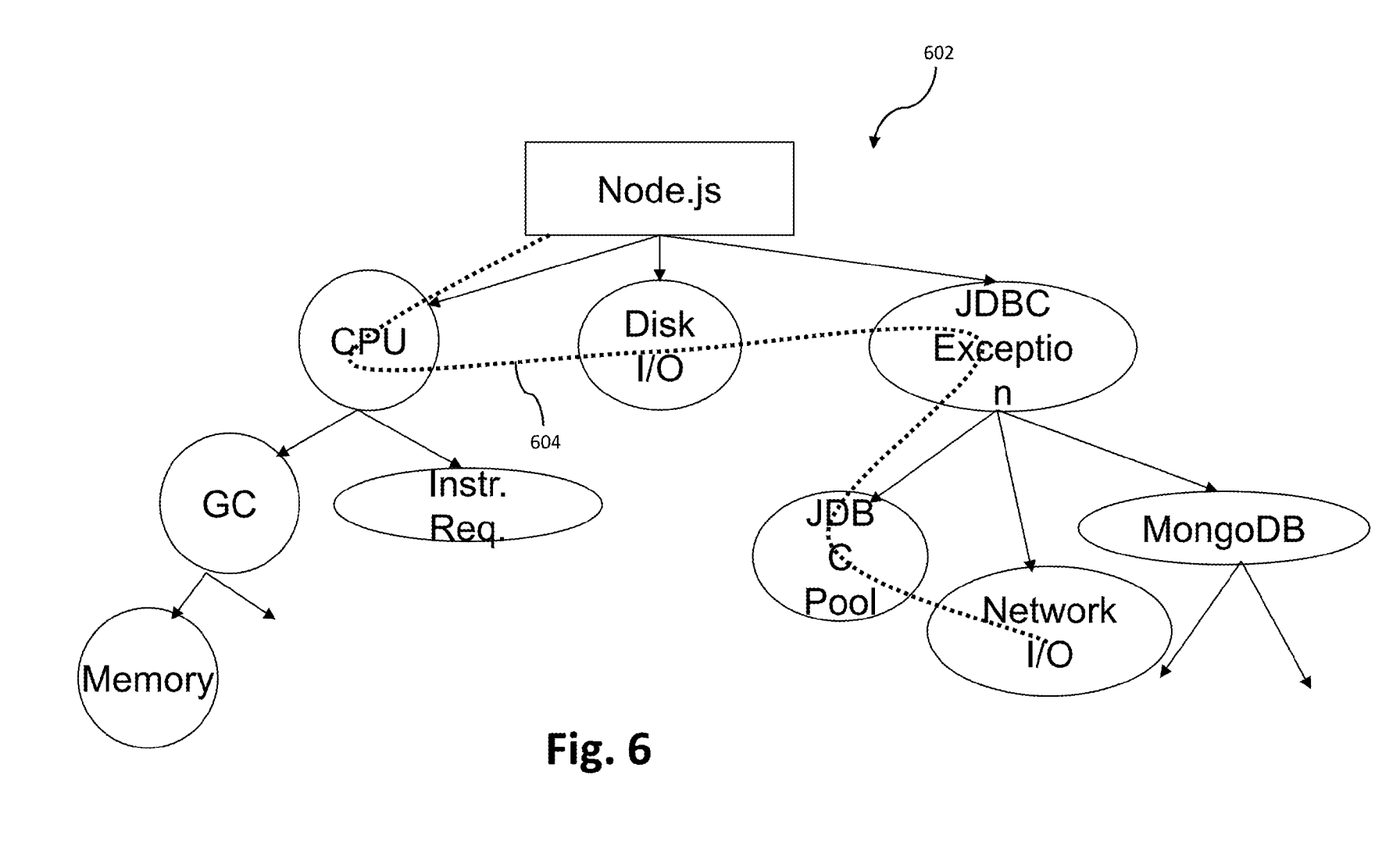
FIG. 6 shows an example hierarchical logical graph and a search trace contemplated by the present invention.

As shown in FIG. 6, embodiments of the present invention can retrieve the hierarchical logical graph based on searching traces, find association rules between metrics based on traces, identify leaf nodes of the logical graph according to the last stopping of the trace, and construct the hierarchical logical graph 602 based on association rules. Once the hierarchical logical graph 602 is constructed, a recommendation engine can provide a metric investigation recommendation to users to address the performance issue based on traversal 604 of the hierarchical graph of the metrics.

Figure 7:
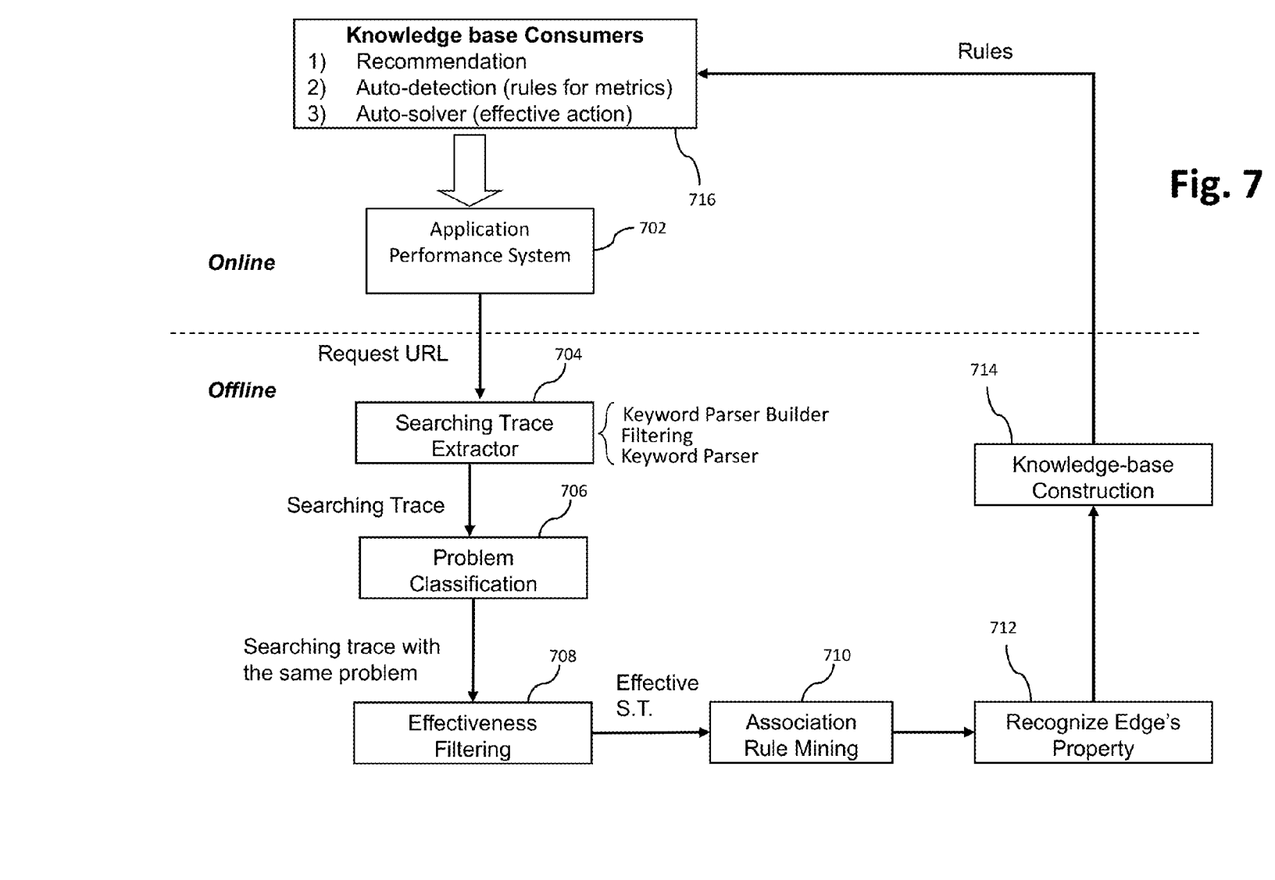
FIG. 7 shows another example embodiment of an application management system for determining a root cause of a performance issue of a software application executing in a distributed computer system contemplated by the present invention.

FIG. 7 shows another example embodiment of an application management system for determining a root cause of a performance issue of a software application executing in a distributed computer system contemplated by the present invention. The system includes an application performance system 702 and a searching trace extractor 704. The searching trace extractor 704 receives a request URL from the application performance system 702. The application performance system 702 constructs a search trace using a keyword parser, filtering and/or a keyword parser. The searching trace extractor 704 outputs the search trace to a problem classifier 706.

The problem classifier 706 classifies the performance issue under investigation by the user. In one embodiment, the problem classifier 706 parses the request URL to determine which component is being investigated by the user. Once the problem is classified by the problem classifier 706, search traces for the same problem are retrieved by the system.

An effectiveness filter 708 separates those search traces that are determined to be generated by expert users for knowledge base construction. Thus, the effective search traces are output by the effectiveness filter 708 to the association rule mining unit 710.

The association rule mining unit 710 determines if there is a temporal association between metrics examined by the users. In other words, association rule mining unit 710 determines if there is an association between component metrics. The recognize edge property unit 712 determines whether nodes in hierarchical graph of metrics are connected by a parent-child edge or a sibling edge. As discussed above, a parent-child edge between a first metric and a second metric in the hierarchical graph is constructed when there is a sequential association between the search traces of the first metric and the second metric for the different users. A sibling edge between the first metric and the second metric in the hierarchical graph is constructed when there is no sequential association between the search traces of the first metric and the second metric for the different users.

The knowledge base construction unit 714 constructs the hierarchical graph based on the sibling and parent-child relationships of the component metrics. A computer memory can be used to store the hierarchical graph of metrics.

After the hierarchical graph of metrics is constructed, a knowledge base consumer unit 716 is used to generate the metric investigation recommendation to address the performance issue based on traversal of the hierarchical graph of the metrics. The metric investigation recommendation can be provided to the application performance system 702 for presentation to the user. Thus, the system can provide guidance to a novice system administrator for solving performance issues in the distributed system by leveraging effective search traces of other system administrators.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for determining a root cause of a performance issue of a software application executing in a distributed computer system, the distributed computer system including multiple components, the method comprising:
   presenting a dashboard to different users for monitoring the distributed computer system;
   parsing a plurality of uniform resource identifiers (URIs) from the dashboard to identify, for each specific user of the different users of the distributed computer system, a plurality of components of the distributed computer system under investigation, and a metric of each component under investigation listed as a parameter within each parsed URI,
   creating a separate search trace, for each search performed by a specific user of the different users, wherein each separate search trace links the identified metric of each component investigated by that specific user in a temporal order each component was investigated by that specific user during the search;
   constructing a hierarchical graph of metrics of a component of the distributed computer system based on the search traces of the metrics of the different users, where a parent-child edge between a first metric and a second metric in the hierarchical graph is constructed when there is a sequential temporal association between the search traces of the first metric and the second metric for the different users, and where a sibling edge between the first metric and the second metric in the hierarchical graph is constructed when there is no sequential temporal association between the search traces of the first metric and the second metric for the different users;
   traversing the hierarchical graph of metrics to identify a metric investigation recommendation to address the performance issue; and
   displaying on the dashboard to the user the metrics identified for recommendation.

2. The method of claim 1, further comprising:
   categorizing the different users of the distributed computer system based on the different users' effectiveness in addressing past performance issues in the distributed computer system; and
   constructing the hierarchical graph of metrics of the component of the distributed computer system based on search traces of the metrics of only the different users whose effectiveness in addressing the past performance issues is above a threshold value.

3. The method of claim 2, wherein the effectiveness in addressing past performance issues in the distributed computer system is proportional to an amount of gain in performance by the distributed computer system divided by an associated cost of solving an associated past performance issue.

4. An application management system for determining a root cause of a performance issue of a software application executing in a distributed computer system, the distributed computer system including multiple components, the system comprising:
   a computer memory to store a hierarchical graph of metrics of a component of the distributed computer system;
   a computer processor to
   present a dashboard to different users for monitoring the distributed computer system;
   parse a plurality of uniform resource identifiers (URIs) from the dashboard to identify, for each specific user of the different users of the distributed computer system, a plurality of components of the distributed computer system under investigation, and a metric of each component under investigation listed as a parameter within each parsed URI,
   create a separate search trace, for each search performed by a specific user of the different users, wherein each separate search trace links the identified metric of each component investigated by that specific user in a temporal order each component was investigated by that specific user during the search;
   construct a hierarchical graph of metrics of a component of the distributed computer system based on the search traces of the metrics of the different users, where a parent-child edge between a first metric and a second metric in the hierarchical graph is constructed when there is a sequential temporal association between the search traces of the first metric and the second metric for the different users, and where a sibling edge between the first metric and the second metric in the hierarchical graph is constructed when there is no sequential temporal association between the search traces of the first metric and the second metric for the different users;
   traverse the hierarchical graph of metrics to identify a metric investigation recommendation to address the performance issue; and
   display on the dashboard to the user the metrics identified for recommendation.

5. The application management system of claim 4, wherein the computer processor is configured to:
   categorize the different users of the distributed computer system based on the different users' effectiveness in addressing past performance issues in the distributed computer system; and
   construct the hierarchical graph of metrics of the component of the distributed computer system based on search traces of the metrics of only the different users whose effectiveness in addressing the past performance issues is above a threshold value.

6. The application management system of claim 5, wherein the effectiveness in addressing past performance issues in the distributed computer system is proportional to an amount of gain in performance by the distributed computer system divided by an associated cost of solving an associated past performance issue.

7. A computer program product for determining a root cause of a performance issue of a software application executing in a distributed computer system, the distributed computer system including multiple components, the computer program product comprising;
   a computer readable storage medium having computer readable program code embodied therewith, the computer readable program code configured to:
   present a dashboard to different users for monitoring the distributed computer system;
   parse a plurality of uniform resource identifiers (URIs) from the dashboard to identify, for each specific user of the different users of the distributed computer system, a plurality of components of the distributed computer system under investigation, and a metric of each component under investigation listed as a parameter within each parsed URI,
   create a separate search trace, for each search performed by a specific user of the different users, wherein each separate search trace links the identified metric of each component investigated by that specific user in a temporal order each component was investigated by that specific user during the search;

construct a hierarchical graph of metrics of a component of the distributed computer system based on the search traces of the metrics of the different users, where a parent-child edge between a first metric and a second metric in the hierarchical graph is constructed when there is a sequential temporal association between the search traces of the first metric and the second metric for the different users, and where a sibling edge between the first metric and the second metric in the hierarchical graph is constructed when there is no sequential temporal association between the search traces of the first metric and the second metric for the different users;

traverse the hierarchical graph of metrics to identify a metric investigation recommendation to address the performance issue; and display on the dashboard to the user the metrics identified for recommendation.

8. The computer program product of claim 7, wherein the computer readable program code is further configured to:

categorize the different users of the distributed computer system based on the different users' effectiveness in addressing past performance issues in the distributed computer system; and construct the hierarchical graph of metrics of the component of the distributed computer system based on search traces of the metrics of only the different users whose effectiveness in addressing the past performance issues is above a threshold value.

9. The computer program product of claim 8, wherein the effectiveness in addressing past performance issues in the distributed computer system is proportional to an amount of gain in performance by the distributed computer system divided by an associated cost of solving an associated past performance issue.

* * * * *